Aug. 10, 1943.   H. I. ANDREWS   2,326,512
DESICCATING APPARATUS
Filed Dec. 28, 1938   4 Sheets-Sheet 2
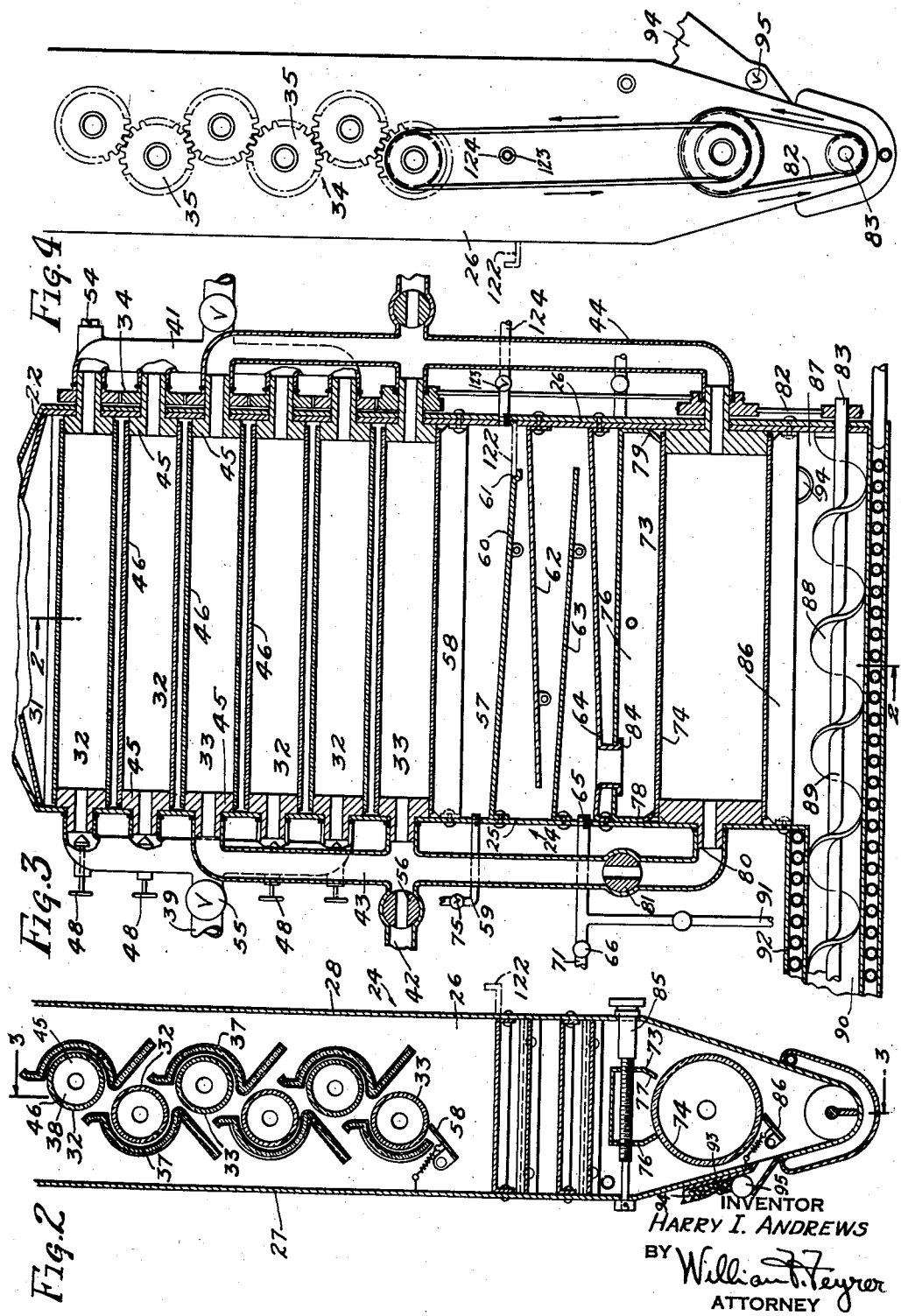
INVENTOR
HARRY I. ANDREWS
BY William F. Feyrer
ATTORNEY

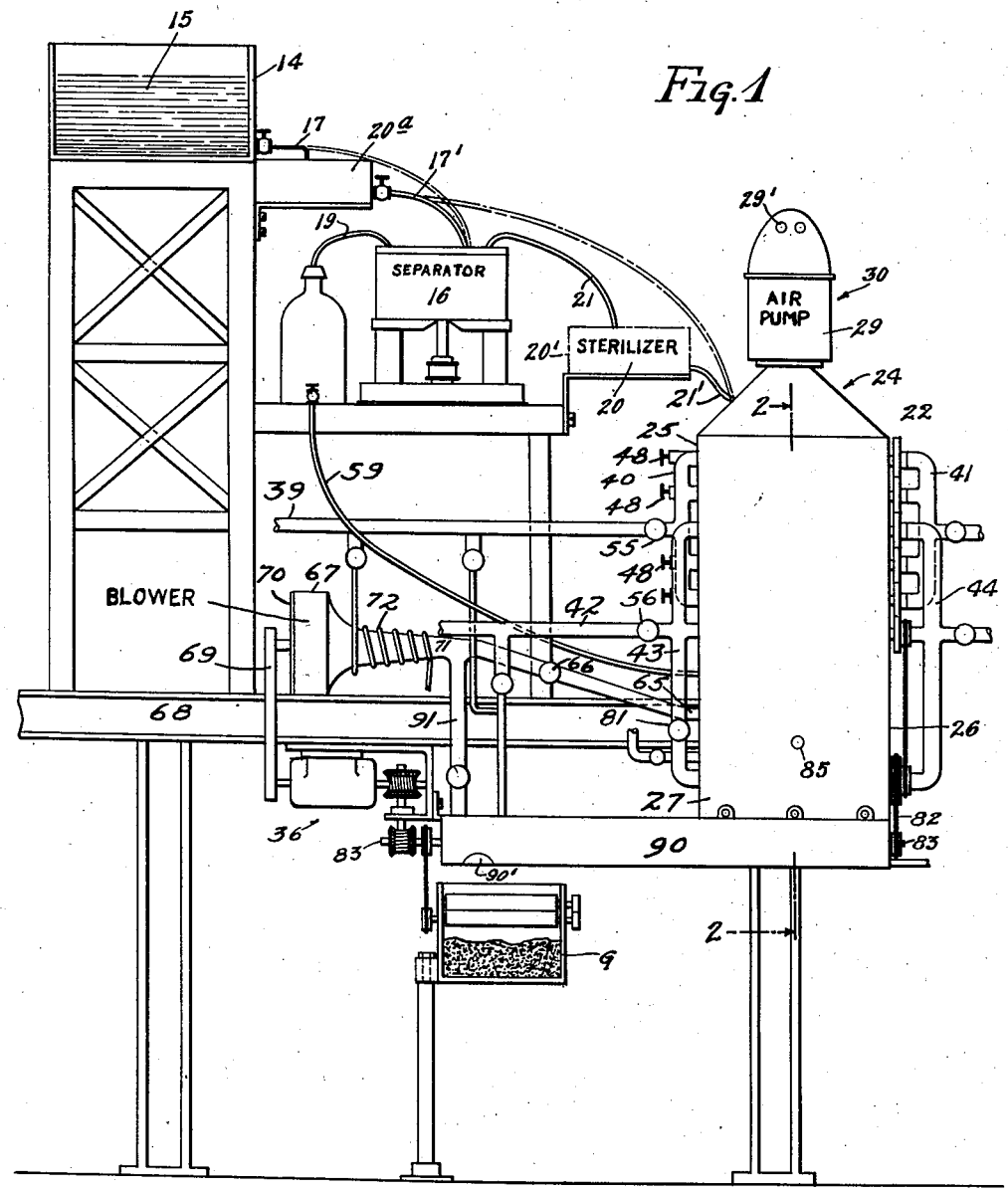

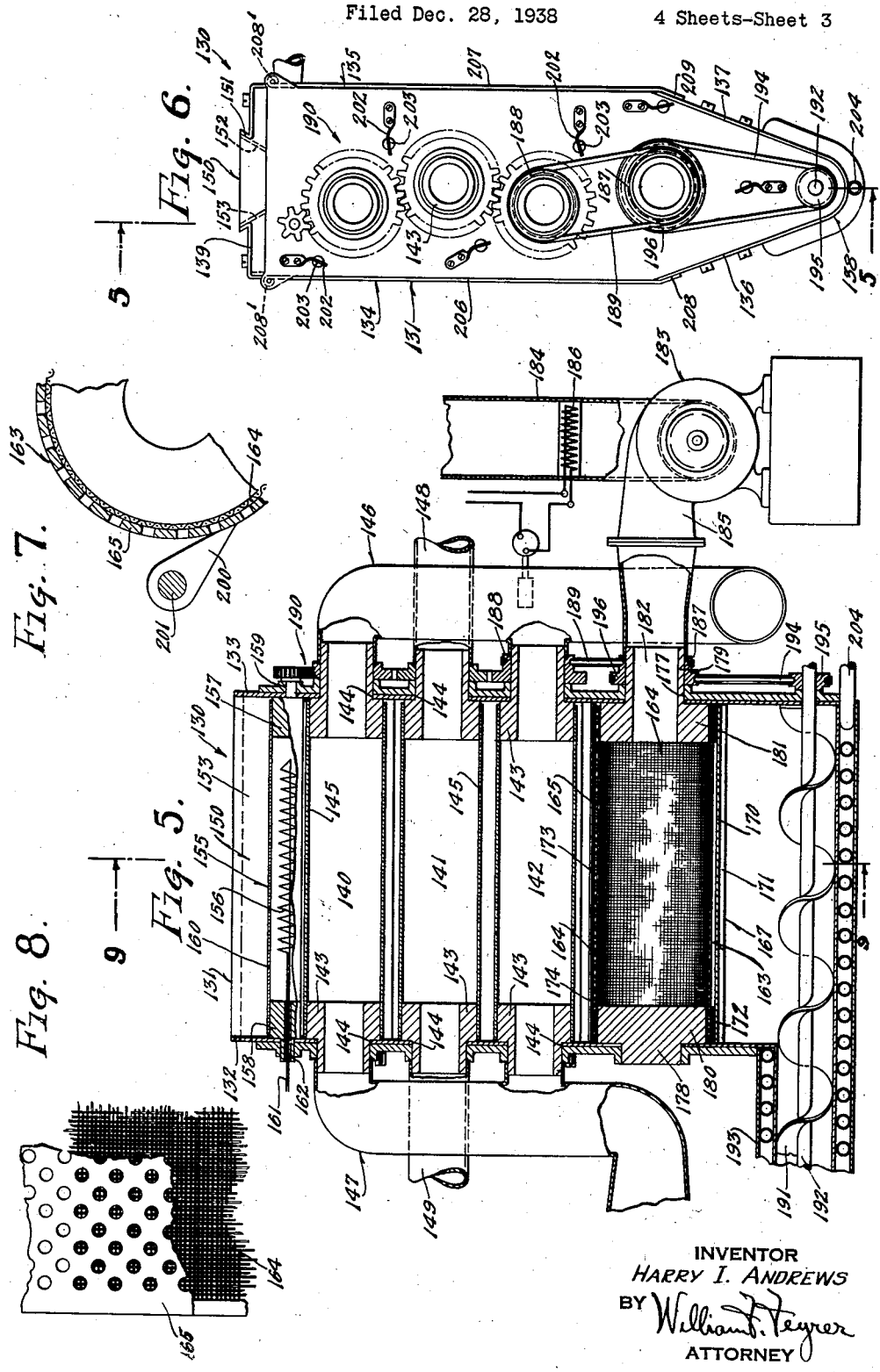

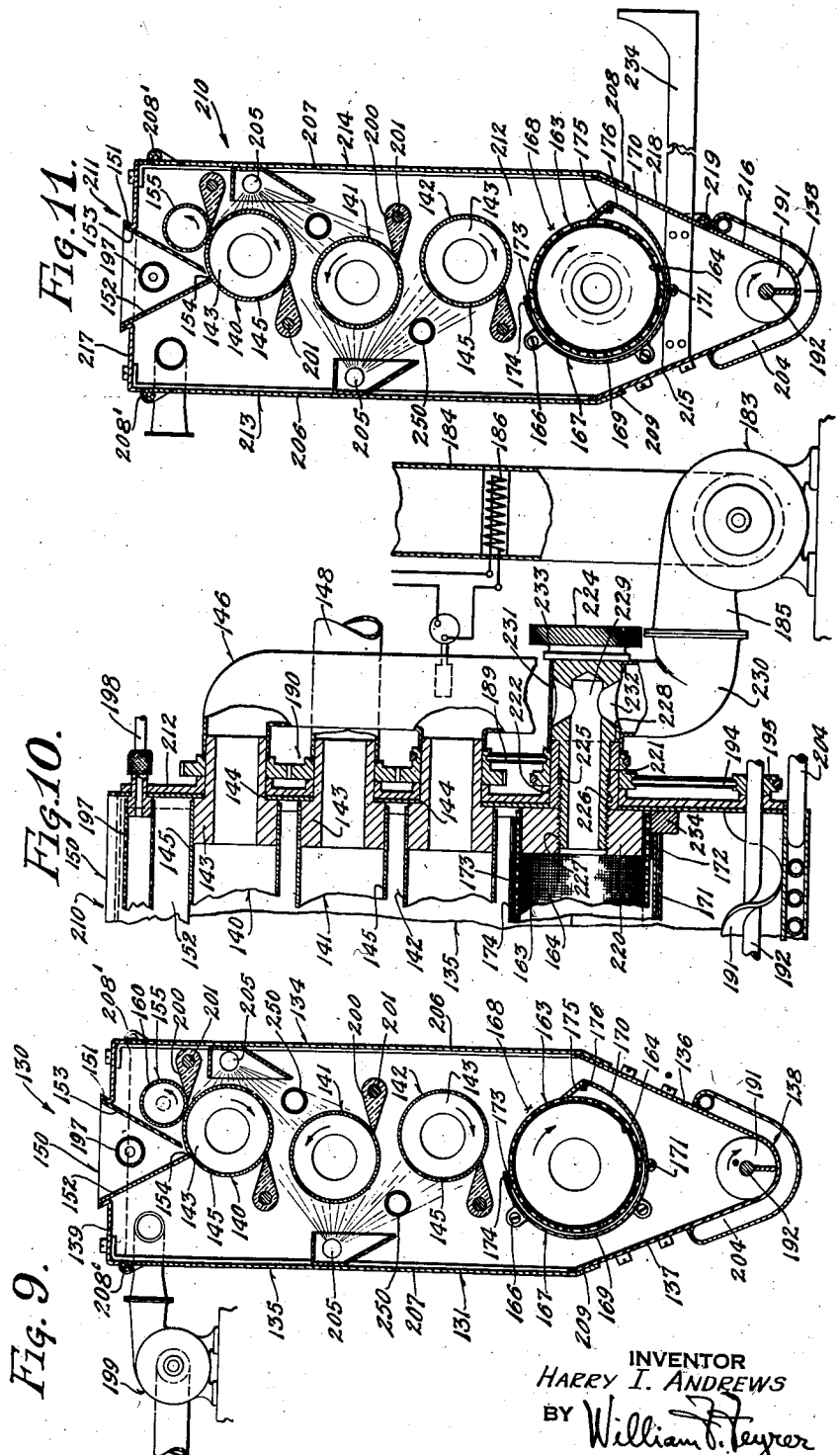

Patented Aug. 10, 1943

2,326,512

UNITED STATES PATENT OFFICE 2,326,512

DESICCATING APPARATUS

Harry I. Andrews, South Norwalk, Conn.

Application December 28, 1938, Serial No. 248,031

13 Claims. (Cl. 159—12)

The present invention relates to a new apparatus for desiccating milk and other products, and represents improvements on the disclosure of my United States Patent No. 1,012,578. This application is a continuation in part of my copending application Ser. No. 15,347, filed April 8, 1935 and now issued as Patent 2,143,256.

It is an object of this invention to provide an improved apparatus for desiccating whole or skimmed milk, ice cream mixes and the like to reduce the same to the consistency of condensed milk or to substantially dry flakes or powder.

It is also an object of the invention to provide such an apparatus whereby an improved milk product is produced which is capable, upon addition of water, to form milk that is practically undistinguishable from fresh whole milk.

It is a further object of this invention to provide an improved apparatus whereby water may be removed from milk without impairing the nutritive value or taste of the milk.

Generally, the present invention relates to an apparatus for desiccating not milk alone but various other products in a quick economical way, and without loss of important minerals and/or other elements.

In apparatuses employed at the present time to produce dried milk and some other products, it is desired to free the product from bacteria. Heretofore it has been customary to provide a step of pasteurization in the dry milk process. However, this pasteurization process very often results in overheating the milk and in a definite loss or change of flavor in the final product.

It is an object of the present invention to provide a desiccating apparatus and process, for producing dry milk particularly in which the bacteria may be destroyed, and yet have the product regain all of its original flavor and like properties when water is added later.

In meeting this object the present invention provides as a step in the dehydrating process, the step of subjecting the product to very high frequency oscillations, capable of destroying bacteria but having no adverse effects on the other constituents of the milk.

Thus, the present invention provides an improved condensed or dried milk, or other product, wherein bacteria are removed by high frequency oscillations.

At the present time there is a growing appreciation of improved health and food value of food products having vitamins naturally stored from sunlight. It is an object of the present invention to provide a process capable of irradiating products. For example, milk from cows within barns and fed from hay in the wintertime does not taste as good and is not as rich in sunshine vitamins as is milk produced out of doors with the fresh grass in the summertime.

Apparatus usually employed for desiccating milk and other products are most often built upon a spray principle and require bulky, awkward apparatus and take up much space.

It is an object of the present invention to provide a compact desiccating apparatus which will be capable of a large production but which will require but very little space.

Some of the features in connection with this object include the provision of a single housing adapted to dehydrate skimmed and/or whole milk (and to irradiate the product); to aerate, mix and/or dry dehydrated skimmed milk; to congeal and/or break up the last mixed product; and/or to further dehydrate the congealed and/or broken-up product.

It is a further object to provide a highly efficient desiccating apparatus which is easy and economical to construct and which is easy to operate.

These and other objects, features, and advantages of this invention will more fully appear from the following description made in connection with the accompanying drawings illustrating suitable apparatus which may be used to carry out the method and in which similar parts are designated by similar reference characters.

In the drawings which illustrate the present preferred form of the invention:

Figure 1 is a plan view diagrammatically illustrating the complete apparatus of the present invention.

Fig. 2 is a sectional view through the main housing, taken on lines 2—2 of Figs. 1 and 3.

Fig. 3 is a sectional view taken on line 3—3 of Fig. 2.

Fig. 4 is a plan view of the right-hand side of the main housing shown in Fig. 3.

Fig. 5 is a sectional view similar to Fig. 3, taken on line 5—5 in Fig. 6, but showing a modified form of the present invention.

Fig. 6 is a view of the right-hand end of the casing shown in Fig. 5.

Fig. 7 is a fragmentary sectional view of the aerating drum.

Fig. 8 is a fragmentary detail view showing the construction of the screen and perforated jacket of the aerating drum.

Fig. 9 is a sectional view taken on the line 9—9 of Fig. 5.

Fig. 10 is a fragmentary sectional view similar to Fig. 5 but showing another modified form of the invention.

Fig. 11 is a sectional view similar to Fig. 9 but of the modified form of the invention shown in Fig. 10.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring to Figs. 1 through 4, there is shown a storage tank 14 in which the milk 15 may be kept under appropriate conditions of temperature until it is to be treated. This tank is connected with a cream separator 16 by means of pipes 17 and 17' (which may be provided with valves and metering devices in order to control and measure the flow of milk from the tank). The separated cream is discharged into a tank 18 through a pipe 19 while the skimmed milk is discharged from the separator into a suitable sterilizer 20 through a pipe 21. This sterilizer may comprise an ozonizer as illustrated in my aforesaid patent, or it may take the form of means for subjecting the milk to high frequency electro-oscillations such as is described in U. S. Patent No. 1,863,222.

By thus subjecting the milk to high frequency vibrations it is possible to destroy bacteria or germs and to do this without overheating and without destroying the enzymes or life of the milk.

The sterilizer may be located to sterilize only the skimmed milk as shown by dot-and-dash lines 20' in Fig. 1, or it may be located before the separator as shown by full lines 20a in the same Fig. 1, in order to sterilize the whole milk.

The sterilizer discharges the skimmed milk into the primary evaporator 22. The evaporator consists of a substantially air-tight main casing 24, including side walls 25 and 26, front and rear walls 27 and 28 surmounted by a smaller casing 29 in which an air or vacuum pump 30 is mounted. A pipe 21', which carries the skimmed milk from the sterilizer, discharges onto an inclined tray 31 which distributes the skimmed milk in a relatively thin film for application to the hot and cold rolls 32 and 33 respectively mounted in the main casing. The several rolls are mounted for rotary movement and a suitable driving mechanism 34 such as a chain and sprocket or intermeshing gears 35 as shown is provided in order to transmit rotary movement from a motor or other driving connection 36.

With the rolls arranged in more or less staggered relationship, the driving mechanism is so arranged that adjacent rolls rotate in opposite directions (see Figs. 1 through 4). If so desired, the several rolls 32 and 33 could be arranged in substantially the same vertical plane, in which event all the rolls could be rotated in the same direction or in the opposite directions as described above. Regardless of the direction of rotation of the rolls, insulating shields 37 may be arranged opposite the ascending sides of the respective rolls to reduce radiation losses.

Each roll of the evaporator has a hollow chamber 38 and is provided internally with means for heating or cooling the roll. The heated rolls may be heated electrically or as shown in Figs. 1–4 by passing steam or any heated fluid from a feed pipe 39 to an inlet manifold 40 and outlet manifold 41 and intermediately influencing the inner surface of the rolls. The cold rolls 33 may be cooled by passing refrigerated brine or other fluid through a main pipe 42 to an inlet manifold 43 and outlet manifold 44 arranged within the roll.

Now it should be noted that the rolls 32 and 33 are each, as shown in Fig. 3, provided with hubs 45 having suitable bearings in the side walls and support glass tubes 46 so that the heat or cold passing therefrom to the products engaging the roller are not given a metallic taste.

Temperature of the individual hot rollers 32 may be regulated by individual valves 48 so that one may be hotter or cooler than the other (see Fig. 3) and the individual rollers may be directly interspersed as in my aforesaid patent. Preferably, the improved apparatus of the present invention, in order to speed up the evaporation or desiccation processes includes groups of three rolls each. The top roll of each group is heated to such a temperature that the outer periphery of the roll is maintained at a temperature of approximately 145 to 150 degrees Fahrenheit. The next roll below is heated so as to obtain a temperature of approximately 135 to 140 degrees Fahrenheit at the outer periphery of the roll. Temperature of individual rolls may be controlled by the individual valves 48. The third roll of each group is cooled so that the temperature at the outer periphery of this roll is preferably 35 to 40 degrees Fahrenheit.

Any desired number of groups of three rolls each may be provided in order to obtain the desired dehydrating action.

Suitable valves 48, 55 and 56 are arranged to control the supply of heat and cold to the respective rolls. Thermometers or pyrometers, visual or recording, not shown, are provided to guide the operator in the manipulation of the valves.

At the bottom of the evaporator section 22 a trough 57 is mounted to receive the concentrated milk as it is discharged from the lowermost roll 33. A doctor blade 58 may be provided to scrape the lower roll. A pipe 59 conducts the cream from tank 18 and discharges the same into the trough 57 and is controlled by a valve 75. As shown in Fig. 3 the end 60 of the trough 57 is inclined downwardly to form a discharge end 61. Arranged below the discharge end 61 is a plurality of trays 62, 63 and 64, each tray being inclined in a direction opposite to that of the tray immediately above. The mixture of cream and concentrated skimmed milk cascades in a zigzag course down over the several trays.

Adjacent the lowermost tray 64 an air inlet 65 is provided through which air may be admitted and controlled by a valve 66. A blower 67 on the frame 68 and actuated by a belt connection 69 to the main driving mechanism 36 is adapted to draw air through a screen 70 and to force it through a line 71. The valve 66 controls the extent of flow, and a coil 72 associated with the line 71 is adapted to heat the air passed therethrough.

Under the action of the air pump 30 provided in upper casing 29 air is drawn through the inlet 65 and upwardly over the trays 64, 63, and 62 through the cascading mixture countercurrent to the flow thereof, aerating it and causing additional removal of moisture from the same.

The blower 67 or the pump 30 alone may force air through the line 71 upwardly over the trays and rollers.

The mixture is discharged from the lowermost tray 64 to a head box 73 which is mounted adjacent a large roll 74. The head box 73 consists of a pair of side members 76 and 77 that extend the length of the roll 74 and end members 78 and 79. One side member 76 alone or with sealing means is mounted to bear against the roll to prevent leakage of the mixture from the head box. The other side member 77 is adjustably mounted and is so arranged that a space of uniform width exists between the roll and said side member for the discharge of material from the head box. This roll is maintained at a temperature of approximately 35 degrees F. by means of a connection 80 with a refrigerant manifold 43 and valve 81, and is rotated by the motor 36 as by a belt connection 82 to a shaft 83, all as shown in Figs. 1, 3 and 4. The mixture is discharged into the head box at one end of the same and flows lengthwise of the roll to such a point that the lateral discharge under the side of the head box is sufficient to remove the mixture from the head box as rapidly as the mixture is supplied. The side of the head box is maintained at a uniform distance from the roll in order to insure the formation of a film on the roll of uniform thickness. Means may be provided to enable an adjustment of this side in order to vary the thickness of the film and/or the capacity of the roll.

A coupling 84 joins the tray 64 and head box 73 together yet permits transverse shifting of the latter, which shifting is effected by a screw 85, to move the wall 77 relative to the roller 74 and thereby vary the film.

The mixture is congealed to a thin brittle film on the roll 74. A doctor blade 86 is provided to scrape the film from the roll as thin flakes, and discharge the same into a hopper 87 located above a screw conveyor 88 which is preferably of a length considerably greater than that of the roll 74. The flakes pass from the hopper 87 down into the trough 89 where the screw 88 operates. The screw may be operated by the main drive 36 as shown in Fig. 1. Rotation of the screw transports the flakes from beneath the hopper and into the housing 90. During the transportation of the flakes through housing 90, a current of air from a side duct 91 of the line 71 is forced over the flakes to evaporate the remaining removable water to obtain the desired product. During the earlier stages of the movement of the flakes by the screw, it may be desirable to maintain the flakes at a relatively low temperature. This may be accomplished by arranging coils 92 around the housing 90 and trough 89. A very simple and practical way of achieving this result is to add small lumps of solid carbon dioxide 93 to the flakes at the inlet end of the screw 88 from a hopper 94 and control 95. The solid carbon dioxide sublimes, refrigerating the newly formed flakes as desired. Furthermore, the gaseous carbon dioxide formed assists in the final dehydration of the chips. A current of dry air at normal room temperature, or heated by the coil 72, is introduced at the discharge end of the screw. This air passes countercurrent to the flakes in the housing 90 to effect a very complete dehydration, and passes through the main casing 24 thence upwardly and out of the openings 29'.

If it is desired to further break down the flakes after they leave the housing 90, they may be discharged through an opening 90' into any suitable breaking or grinding device, such as shown at G in Fig. 1.

Briefly, the process for desiccating milk would be as follows: Upon obtaining sufficient milk to commence operations, milk is discharged from the reservoir 15 to the cream separator 16. Cream is separated and removed to a suitable tank 18, the skimmed milk being passed through a suitable sterilizer 20.

In the present preferred form it is first passed over a pair of hot rollers 32, the surface temperature of the first being approximately 145 to 150 degrees F. It is not desirable to heat milk above 140 degrees F. but the milk is in contact with this roll for such a short period of time that the milk does not reach the temperature of the roll surface. The milk then passes to another heated roll, the surface temperature of which is approximately 135 to 140 degrees F. After passing down this roll, the milk is chilled by the cold roll 33. This cycle of temperature treatments is repeated one or more times until the desired concentration of skimmed milk is obtained. During the said treatment in the primary evaporator, air is continuously drawn through and over the milk to assist evaporation.

As the concentrated skimmed milk passes into the trough 57 the cream is remixed with the skimmed milk. This mixture is allowed to cascade downwardly over the trays 62—64 while passing air through and over the mixture whereby the mixture is further evaporated, the cream and skimmed milk are thoroughly intermixed and aerated. If it is desired to convert this concentrated material to a substantially dry flake or powder, the concentrated material is congealed to a thin hard film on the refrigerated roll, the film broken up to a flaky material which is further dehydrated by passing the same through a housing 90 where it is subjected to air which is progressively drier as the flakes approach the point of discharge.

In Figs. 5 through 9 another modified form of the invention is shown. It includes a modified evaporator 130 having a main casing 131. As shown, this main casing 131 is defined by opposed end walls 132 and 133, opposed side walls 134 and 135 which preferably have lower sections 136 and 137 respectively, which converge inwardly to provide a troughlike bottom 138 for the casing, and a top wall 139.

Mounted within the casing and rotatably supported by the end walls 132 and 133 are a plurality of vertically spaced, horizontally extending main rollers 140, 141 and 142. Preferably, and as shown, these main rollers are in slightly staggered relation as are the rollers 32 and 33 in the form first described, and, similarly to those rollers, include hollow hubs 143 inserted in suitable bearings 144 in the end walls and which support glass tubes 145 so that the milk contacting the rollers is not given a metallic taste.

To provide alternate zones of heat and cold within the casing 131, the upper and lower rollers 140 and 142 are heated and the intermediate roller 141 is chilled. This may be advantageously achieved by passing a heated fluid into the rollers 140 and 142 from an inlet manifold 146 associated with the hollow hubs 143 which extend through the end wall 133. A return manifold 147 associated with the hollow hubs 143 at the other end of the rollers 140 and 142 is provided for conveying the heated fluid away from the rollers. The chilling of the intermediate roller 141 may be similarly achieved by passing a refrigerant therethrough, as by associating the hollow hub 143 at one end of the roller 141 with a refrigerant inlet conduit 148 and the hollow hub 143 at the other end with an outlet conduit 149.

While only three rollers 140, 141 and 142 have been shown it is to be understood that more than three rollers may be utilized and that a pair of hot rollers may be used together as in Figs. 2 and 3, the important factor being that the rollers are arranged so as to provide alternate zones of heat and cold.

Now of importance, there is embodied in this modified form of the invention a milk-receiving tank 150, suitably supported in an opening 151 in the top wall 149, and preferably having downwardly converging side walls 152 and 153 separated at the lower ends to provide a flow passage 154 for directing the milk onto the heated upper main roller 140. As shown, the lower end of the wall 152 is in engagement with the roller while the lower end of the other wall 153 is spaced slightly upward of the roller to permit the milk to form in a relatively thin sheet as it flows onto the roller.

To further spread the milk over the roller 140 and to render the sheet more uniform there is preferably provided a calender roller 155 which is spaced from the main roller 140 just sufficiently to permit the passage of a thin sheet of liquid milk therebetween. This calender roller by being heated to a temperature preferably somewhat in excess of the main roller 140 serves, in addition to spreading the sheet of milk, to give the milk a preliminary heat treatment and thus more quickly raise the temperature of the milk coming from the receiving tank. A suitable electric heating element 156 in the calender roller 155, which, as shown, may comprise hubs 157 and 158 journaled in suitable bearings 159 in the end walls 132 and 133 and supporting a glass tube 160, provides an advantageous means for heating the roller. A suitable electric conduit 161 may be inserted through a bore 162 in the hub 158 to connect the heating element 156 with any inconvenient source of electricity.

Of particular importance there is positioned in the casing below the lower main roller 142 a rotatable drum 163 so constructed that as the milk leaves the lower heated roller 142 and form in a thin sheet thereon, warm dry air or oxygen is bubbled through the milk from the interior of the drum. This drum 163 comprises a tubular screen 164 of very fine mesh. The screen, while permitting air or oxygen from the drum to pass outwardly into the milk, serves to prevent the milk from entering the interior of the drum. Overlying the screen 164 and rotatable therewith is a tubular jacket 165 of perforated sheet metal which serves as a guard for the screen.

Fixed to the end walls 132 and 133, as by suitable brackets 166, is a tubular sealing shield 167 formed with a longitudinally extending slot 168 in the upper side thereof, and positioned to confine closely therein the rotatable drum 163.

As shown, this sealing shield 167 comprises a rear part 169 to which the brackets 166 are secured, and a forward part 170 pivotally secured to the rear part by spring hinges 171.

To definitely limit the escape of air or oxygen from the rotatable drum to the limited area defined by the slot 168, suitable packing rings 172 are secured to the shield 167 at opposite ends thereof, and a packing strip 173 is secured to the shield to extend longitudinally thereof adjacent the edge 174 of the rear part 169 defining the rear extremity of the slot 168. A doctor blade 175 connected to the forward pivoted part 170 adjacent the longitudinal edge 176 thereof defining the forward extremity of the slot 168 is yieldingly maintained in scraping engagement with the drum 163 and, in addition to serving as a means for removing milk from the drum, serves to complement the packing rings 172 and packing strip 173 in sealing the drum.

As the milk leaves the lower main roller 142 it is received and supported in the form of a thin sheet on that portion of the rotatable drum which is exposed through the slot 168 and is carried around by the drum to a point adjacent the forward extremity of the slot. There the doctor blade 175 scrapes the dehydrated milk from the drum.

As shown in Figs. 5 and 9 the drum may be rotatably mounted in bearings 177 in the end walls 132 and 133 of the casing by means of integral hub extensions 178 and 179 on opposed end plugs 180 and 181 respectively which provide the support for the tubular wire screen 164 and jacket 165. In this construction the end plug 180 is formed solid while the end plug 181 and hub extension 179 are formed hollow to provide a passage 182 for warm dry air from a suitable blower 183 to the interior of the drum.

This blower 183, which as shown is preferably of the rotary type, draws air from any suitable source through an inlet pipe 184 and forces the same outwardly through an outlet pipe 185 associated with the hub 179. A thermostatically controlled electric heater 186 may be conveniently placed in the inlet pipe 184 to maintain the air entering the drum at any desired temperature.

In order that each of the several rollers 155, 140, 141 and 142 and the drum 163 may be rotated concurrently there is fixed to the hub 179 of the drum 163 a pulley wheel 187 connected to a pulley wheel 188 on the hub of the lower main roller 142 by a belt 189. A chain of gears 190 interconnecting the hubs of the other main rollers 140 and 141 and the calender roller 155 serves to complete the driving mechanism.

Positioned below the drum 163 and adjacent the bottom of the casing 131 is a screw conveyer 191 mounted on a shaft 192 extending through the end wall 133. This screw conveyer 191, like the screw conveyer 88 in Fig. 3, extends out of the main casing 131 and into a housing 193 extending laterally from the main casing and from which the dehydrated milk is discharged. Rotation of the conveyer 191 may be achieved in a manner similar to the rotation of the conveyer 88 in Figs. 1 and 2, and through a belt connection 194 between a pulley wheel 195 on the shaft 192 and a pulley wheel 196 on the hub 179 of the drum, concurrent actuation of the chain of gears 190 may be achieved.

In the operation of the modified evaporator 130 milk may be conveyed from any suitable source, as from a storage tank, such as shown in Fig. 1, to the receiving tank 150. There the milk is preferably sterilized by bubbling ozone therethrough from a perforated cylinder 197 supported by the end walls 132 and 133 and which may be connected, as by a conduit 198, to any suitable source of ozone under pressure.

By gravity, the milk then flows from the receiving tank 150 to the upper heated roller 140 which in the modified evaporator 130 is preferably maintained at a temperature of from 115 degrees to 120 degrees F. The calender roller 155, which is preferably maintained at a temperature of about 140 degrees F., cooperates with the main roller 140 to form the milk in a thin even sheet and aids the roller 140 in initially raising the temperature of the milk.

From the roller 140 the milk drops to the chilled roller 141 which is preferably maintained at a temperature of from 35 to 40 degrees F., and from thence the milk falls onto the lower heated roller 142 which, like the upper roller 140, is preferably maintained at a temperature of from 115 to 120 degrees F.

During the passage of the milk downwardly over the several rollers 140, 141 and 142 the evaporation of the moisture from the milk is particularly rapid and thorough due to the mist or fog created by the alternate heating and chilling of the milk as it passes downwardly in the casing 131. A suitable vacuum pump 199 at the top of the casing serves to draw off the mist and to create a flow of air in the casing counter to the general downward passage of the milk over the several main rollers 140, 141 and 142.

In order that the milk may be completely removed from the several rollers 155, 140, 141 and 142, there are provided doctor blades 200 carried by shafts 201 supported by the end walls 132 and 133 of the casing. Yielding and operative engagement between the doctor blades 200 and the respective rollers is maintained by spring fingers 202 (see Fig. 6) which engage in slots 203 in the ends of the doctor blade shafts.

As the partially dehydrated milk is scraped from the lower main roller 142 it drops on the drum adjacent the rear extremity of the slot 168, and as the drum rotates it forms as a relatively thin viscous sheet. While on the rotating drum 163, the warm dry air or oxygen, preferably having a temperature of about 100 degrees F., is bubbled or percolated through the milk. This warm dry air serves to substantially complete the dehydration of the milk and, moreover, of particular importance, the intimate intermixture of the air and the milk serves to preserve the fat globules in the milk intact during the final dehydration. The air from the drum 163 after bubbling through the milk is drawn upwardly through and out of the casing 131 by the vacuum pump 199.

As the drum 163 rotates the thoroughly aerated and substantially dehydrated milk is scraped from the drum by the doctor blade 175 and falls to the troughlike bottom of the casing where the screw conveyer 191, similarly to the conveyer 88 in Fig. 3, moves the milk outwardly from the casing 131 and through the housing 193.

During the passage of the milk through the housing 193 it is preferably, as in the form of the invention disclosed in Figs. 1 through 4, subjected to a countercurrent of warm air to remove any moisture that may yet remain in the milk. Also, as in the form shown in Figs. 1 through 4, coils 204, which may receive refrigerant from the pipe 149, are arranged around the housing 193 and under the bottom of casing 131 to chill the milk and to cooperate with the warm air in further removing moisture therefrom.

Also, if desired, small lumps of carbon dioxide may, as in the form first described, be added to the scrapings of substantially dehydrated milk in the bottom of the casing 131. This carbon dioxide sublimes, refrigerating the newly formed flakes as desired, and moreover assists in the final dehydration of the milk scrapings.

Upon discharge from the housing 193 the dehydrated milk scrapings may be directed to a breaker mechanism, such as the breaker mechanism G shown in Fig. 1, where the scrapings are broken up preparatory to being placed in containers for shipment.

From the above it is seen that the dehydrating process as performed by this modified form of the invention includes the steps of initially passing ozone through the liquid material, forming the material as a relatively thin sheet and passing the same downwardly through alternate zones of heat and cold in a countercurrent of air to partially dehydrate the material, and supporting the partially dehydrated material in the form of a thin sheet and bubbling warm dry air up through the material to thoroughly aerate and further dehydrate the same.

Preferably, and as shown, there are provided within the casing 131 and at either side of the main rollers 140, 141 and 142 a plurality of lamps 205 for directing ultraviolet rays to the milk as it flows downwardly in the casing. These ultraviolet-ray lamps may be of any suitble construction, as for example a mercury arc lamp. Such irradiation of milk by ultra-violet rays has proved to produce very beneficial results.

To enable a ready access to the interior of the evaporator 130, shown in Figs. 5 through 9, the side walls 134 and 135 are preferably formed with movable closure sections 206 and 207, respectively. These closure sections extend from substantially the top of the casing to the lower inwardly converging sections 136 and 137 of the side walls. Suitable hinge connections 208 between the upper portions of the closure sections and the end walls of the casing 131 provide a convenient mounting for the closure sections so that they may be swung outwardly to open the casing. Converging sections 208 and 209 at the lower ends of the closure sections 206 and 207, respectively, are provided to overlap the lower sections 136 and 137, respectively, of the side walls and thus serve not only to seal the casing when the closure sections are in the position shown in Fig. 9, but serve also as stop means for limiting the swinging movement of the closure sections in one direction. Any suitable means may be provided for locking the closure sections in a closed position.

This provision of movable closure sections in the casing 131 is of considerable importance because not only is ready access given for the purpose of repairing the several rollers but also access is given for the purpose of periodically cleaning the several rollers.

In Figs. 10 and 11 there is shown another modified evaporator 210. This evaporator is essentially the same as the evaporator disclosed in Figs. 5 and 9, and described immediately above. The process performed by the evaporators 130 and 210 is exactly the same.

The modified evaporator 210 differs from the evaporator 130 solely in the provision of a slightly modified main casing 211, and in the particular mounting of the drum from which air is percolated through the milk.

This modified casing 211, like the casing 131, comprises opposed end walls 212, opposed side walls 213 and 214 which preferably have lower sections 215 and 216, respectively, which converge inwardly to provide a troughlike bottom for the casing 131, and a top wall 217 which supports a milk-receiving tank 150 for directing milk downwardly to the several main rollers 140, 141 and 142 and the calender roller 155 therein.

The casing 210 differs from the casing 131 in the provision, in addition to the hingedly mounted closure sections 206 and 207, of a supplemental movable closure section 218 in the inwardly converging side wall 216. This supplemental movable closure section 218 constitutes the upper portion of the lower section 216 of the side wall 207 and is hingedly connected adjacent its lower edge to the end walls 212 by suitable hinge connections 219. Any convenient releasable means may be provided for normally maintaining the supplemental closure section 218 in the closed position as shown in Fig. 11.

With this construction ready access is not only given to the several main rollers 140, 141 and 142 and the calender roller 155, but access is also given so that the drum 163 may be readily removed from the interior of the casing for repair or for any other desired purpose.

In order that the drum 163 may be thus readily removed, modified end plugs 220 are utilized. Thus, instead of providing integral hub extensions on the end plugs 220, as in the form disclosed in Fig. 5, separate hub extensions 221 are provided which, like the integral hub extensions 178 and 179, are rotatably mounted in bearings 222 in the end walls 212. As shown in Fig. 10, there is provided for connecting the separate hub 221 with the end plug 220 and for directing the warm dry air or oxygen from the blower 183 to the interior of the drum, a novel connecting member 224.

This novel connecting member 224 is generally cylindrical in form and has an exteriorly threaded portion 225 engageable with threads 226 and 227 formed in bores in the hub 221 and the end plug 220, respectively. A shoulder 228 on the connecting member 224 is engageable with the hub 221 and serves to jam the same against the end plug 220. Formed within the connecting member 224 and extending longitudinally thereof to the interior of the drum 163 is a passage 229. Warm dry air or oxygen is forced into this passage from the blower 183 through a conduit 230 having a portion 231 encircling the connecting member 224 and overlying apertures 232 which connect the conduit with the longitudinal passage 229 in the member 224.

Removal of the connecting member 224 may be readily accomplished by grasping the knurled turning wheel 233 secured to the outer end thereof and unscrewing the connecting member from the end plug 220.

The other end of the drum may be removably supported by means of a separate hub exactly like the hub 221 and supported by a bearing in the end wall. The end plug at the other end of the drum is of exactly the same construction as the end plug 220, and the connecting member at the other end of the drum differs from the connecting member 224 solely in the fact that it is solid and is not formed with a longitudinal air-conducting passage.

For facilitating the removal of the drum 163 when the connecting members are withdrawn from the end plugs, there is provided a pair of supporting tracks 234, respectively connected to the inside of the opposed end walls 212, and extending laterally from the main casing 211. Small cutouts may be formed in the supplemental closure section 218 to accommodate the tracks.

With this advantageous construction, therefore, when it is desired to remove the drum 163, it is merely necessary to swing open the movable closure sections 207 and 218 and to swing the pivoted forward part 170 of the sealing shield 167 downwardly into an inoperative position below and between the tracks 234. Any suitable means may be utilized to lock the pivoted part 170 in the lower position. Then the connecting members are removed from the end plugs 220 of the drum 163 and the latter may be rolled on the tracks 234 and out of the casing.

If desired, and as shown in Figs. 9 and 11, perforated pipes 250 may be provided for directing warm dry air to the milk as it falls from one main roller to another. As illustrated, one of the pipes 250 is positioned between the rollers 140 and 141 and another of the pipes is positioned between the rollers 141 and 142. The air from these pipes, which preferably extend for the width of the rollers, aids materially in the thorough and efficient drying of the milk. A convenient supply of warm dry air for the pipes 250 is the blower 183 which forces warm air into the drum 163.

While in the description of the invention, its adaptation to the dehydration of milk has been particularly emphasized, it is to be understood that it is not intended to so limit the invention as it is also applicable to the dehydration of other products.

Variations and modifications may be made within the scope of this invention and portions of the improvements may be used without others.

Having thus described the invention, what I claim is:

1. In apparatus for dessicating milk, including a casing, a plurality of vertically spaced horizontally extending hot and cold main rollers for partially dehydrating said milk by subjecting the same to alternate zones of heat and cold as it passes downwardly in said casing, the combination of means for directing liquid milk to the upper of said rollers; and a heated calender roller cooperable with the upper of said rollers to preheat the milk and to spread the same in a thin film.

2. In an apparatus for dessicating milk, the combination of a rotatable drum for receiving milk and supporting the same in the form of a thin sheet, means for supplying air to said drum, said drum having apertures in the surface thereof for directing air to aerate and dehydrate said milk while it is supported in the form of said thin sheet thereon; sealing means for said apertures, operable to open only those apertures passing through a limited milk supporting area during the rotation of the drum; and means for removing said dehydrated and aerated milk from said drum.

3. An apparatus for desiccating material comprising a casing; means for directing the material down into said casing in the form of a thin sheet; alternate hot and cold rollers for subjecting said material to alternate zones of heat and cold to partially dehydrate the same as it passes downwardly in said casing; means in the casing for receiving and supporting said material in the form of a thin sheet after it leaves said rollers; means for introducing dry air in the bottom of the casing and removing said air at the top thereof, said air passing upwardly and engaging the material while supported in the thin sheet to aerate the same and then engaging the material passing over said rollers.

4. An apparatus for desiccating milk comprising a casing; means for directing liquid milk down into said casing in the form of a thin sheet; alternate heated and cooled rollers for subjecting said milk to alternate zones of heat and cold to partially dehydrate the same as it passes downwardly in said casing; means for receiving and supporting the milk in the form of a thin sheet after it leaves said rollers; means beneath said rollers in said casing for causing a flow of dry air in said casing and in the opposite direction to the flow of milk therein to aerate said milk while it is supported in said form of a thin sheet; means for conveying said dehydrated milk from said casing; and means for passing a current of warm air in a direction counter to that of the milk as it is moved by said conveying means.

5. In an apparatus for desiccating milk, a casing having a top and a bottom with interconnected side walls connecting same, means for directing liquid milk downwardly through said casing in the form of a thin sheet; means comprising hot and cold rollers supported at the top of the casing for supporting and dehydrating said milk, means supported at the bottom of the casing for receiving and aerating said milk after passage from the top of said casing, said dehydrating and aerating means providing successive intercommunicating zones within said casing for handling wet and partially dry milk respectively, said aerating means including means for supplying warm, dry fluid to the interior of said casing adjacent the bottom thereof, and means at the top of said casing for enabling withdrawal of said warm fluid, said dry fluid engaging the milk flowing over the rollers to aid in dehydrating the milk.

6. In an apparatus for desiccating milk, a casing having a top and a bottom with interconnected side walls connecting same, means for directing liquid milk downwardly through said casing in the form of a thin sheet; means supported at the top of the casing for receiving and dehydrating said milk, means comprising a rotary screen drum supported at the bottom of the casing for supporting and aerating said milk after passage from the top of said casing, said dehydrating and aerating means providing successive intercommunicating zones within said casing for handling wet and partially dry milk respectively, said aerating means including warm, dry fluid supply means for the interior of said drum, said fluid bubbling through the milk supported on said drum, and means at the top of said casing for enabling withdrawal of said warm fluid.

7. In an apparatus for desiccating milk, a casing having a top and a bottom with interconnected side walls connecting same, means for directing liquid milk downwardly through said casing in the form of a thin sheet; means comprising hot and cold rollers supported at the top of the casing for dehydrating said milk, means comprising a rotary screen drum supported in the bottom of the casing to receive the milk from said rollers for aerating said milk after passage from the top of said casing, said dehydrating and aerating means providing successive intercommunicating zones within said casing for handling wet and partially dry milk respectively, said aerating means including warm, dry fluid supply means for the interior of said rotary screen drum, a trough at the bottom of said rotary screen drum for collecting dried aerated milk therefrom, rotary means for cleaning out said trough, driving means journalled in said casing for rotating said rollers, drum and clean-out means, and means at the top of said casing for enabling withdrawal of said warm fluid.

8. In an apparatus for desiccating milk, a casing having a top and a bottom with interconnected side walls connecting same, means for directing liquid milk downwardly through said casing in the form of a thin sheet; means comprising hot and cold rollers supported at the top of the casing for dehydrating said milk, means comprising a rotary screen drum supported in the bottom of the casing for receiving the milk from the rollers and aerating said milk after passage from the top of said casing, said dehydrating and aerating means providing successive intercommunicating zones within said casing for handling wet and partially dry milk respectively, said aerating means including warm, dry fluid supply means associated with the drum for bubbling said warm dry fluid through the milk in aerating zone, and means at the top of said casing for enabling withdrawal of said warm fluid.

9. The invention as defined in claim 3, wherein the means for receiving and supporting the material in a thin sheet comprises downwardly inclined plate means extending transversely of the casing.

10. The invention as defined in claim 3, wherein the means for receiving and supporting the material in a thin sheet comprises a plurality of trays over which said dehydrated material travels by gravity for further dehydration and for aeration.

11. The invention as defined in claim 3, wherein the means for receiving and supporting the material in a thin sheet comprises a perforated member and the means for introducing air into the casing is disposed below the perforated member whereby the air bubbles through the material supported on said member.

12. The invention as defined in claim 3 wherein the means for receiving and supporting the material in a thin sheet comprises a rotatable drum having an apertured material-supporting surface and the means for introducing air into the casing directs the air into the interior of the drum whereby the air passes through the apertures and bubbles through the material supported thereon.

13. An apparatus for desiccating material comprising a casing; means for introducing the material into the casing; dehydrating means adjacent the top of the casing for receiving and supporting the material in a thin sheet, said dehydrating means being arranged to permit downward movement of the dehydrated material; a drum at the bottom of the casing having a perforated surface for receiving and supporting the thin sheet of material moving from the dehydrating means; means for introducing drying fluid into the drum; means for directing and causing the fluid to flow only through the perforations in the part of the drum upon which the thin sheet of material is supported; and means for withdrawing the fluid from the casing adjacent the top thereof to cause the fluid to flow from the bottom of the casing to the top thereof and into engagement with the material in the dehydrating means.

HARRY I. ANDREWS.

2,326,512

CERTIFICATE OF CORRECTION.

Patent No. 2,326,512.　　　　　　　　　　　　　August 10, 1943.
　　　　　　HARRY I. ANDREWS.

It is hereby certified that error appears in the printed specification of the above numbered patent requiring correction as follows: Page 3, second column, line 42, after "discharge." insert the following paragraphs -

--The trough and the trays 57, 62, 63 and 64 may be disposed at any desired angle. If the skimmed milk coming from the lowermost roll is thoroughly dried or if it is a stiff liquid, the trough and trays may be at a 45-degree or greater angle.

The housing 90 and trough 89 of the casing 24 with the screw 88 may be removed so that the product will drop from the doctor blade 86 for suitable distribution. As shown by dot-and-dash lines in Figs. 2 through 4, the upper trough 57 may be provided with a valve plate 122 slidable on the trough and in the side wall 26. When the slide is back and a valve 123 closed, the aperture between the ends 61 of the trough 57 and wall 26 allows the material to flow down into the tray 62 next below.

However, when the valve plate 122 is pushed in it closes the gap so that the material cannot reach the tray and when the valve 123 is opened an evaporated skimmed milk may be passed to suitable containers from the line 124. Similarily, by passing cream to the trough from the valve 75 and line 59 an evaporated whole milk may be passed out through the valve 123 and line 124. -- ;

page 4, second column, line 30, after the word "draws" insert --dry--; page 5, second column, line 22, for "suitble" read --suitable--; and that the said Letters Patent should be read with this correction therein that the same may conform to the record of the case in the Patent Office.

Signed and sealed this 16th day of November, A. D. 1943.

Henry Van Arsdale,
(Seal)　　　　　　　　　　　　　　Acting Commissioner of Patents.